United States Patent
Carswell

(10) Patent No.: US 9,487,189 B1
(45) Date of Patent: Nov. 8, 2016

(54) DEVICES FOR EXTRICATING MUD-STALLED VEHICLES

(71) Applicant: Larry Bernard Carswell, Conyers, GA (US)

(72) Inventor: Larry Bernard Carswell, Conyers, GA (US)

( * ) Notice: Subject to any disclaimer, the term of this patent is extended or adjusted under 35 U.S.C. 154(b) by 0 days.

(21) Appl. No.: 15/048,910

(22) Filed: Feb. 19, 2016

Related U.S. Application Data

(60) Provisional application No. 62/115,611, filed on Feb. 12, 2015.

(51) Int. Cl.
*B60S 9/22* (2006.01)
*B60S 9/205* (2006.01)
*B66F 19/00* (2006.01)

(52) U.S. Cl.
CPC .............. *B60S 9/205* (2013.01); *B66F 19/00* (2013.01)

(58) Field of Classification Search
CPC ..... E04H 12/34; E04H 12/344; E21B 19/08; B60S 9/00; B60S 9/04; B60S 5/00
See application file for complete search history.

(56) References Cited

U.S. PATENT DOCUMENTS

| | | | | |
|---|---|---|---|---|
| 3,647,185 A | * | 3/1972 | Phibbs | A01G 23/065 254/30 |
| 4,256,286 A | * | 3/1981 | Hudgins | E04H 17/265 254/30 |
| 4,804,165 A | * | 2/1989 | Pippin | E01B 29/26 254/132 |
| 6,857,619 B1 | * | 2/2005 | Jangula | E02F 3/96 254/132 |
| 6,866,248 B1 | * | 3/2005 | Sears | E04H 17/265 254/30 |
| 8,544,946 B2 | * | 10/2013 | Holden | B66F 9/065 254/30 |

* cited by examiner

*Primary Examiner* — Lee D Wilson
(74) *Attorney, Agent, or Firm* — Michael J. Bootcheck, LLC

(57) ABSTRACT

The present invention is for a motor driven paddle for mounting to the frame of a vehicle wherein the motor rotates a first shaft which is linked to a second shaft that is thereby rotated via such linkage. The second shaft has one or more paddles that may come into contact with the ground such that the device may be utilized to free, or move, the vehicle if it has lost traction such as by being mud-stalled. The device may be stowed when not in use.

11 Claims, 7 Drawing Sheets

DEVICES FOR EXTRICATING MUD-STALLED VEHICLES

CROSS-REFERENCE TO RELATED APPLICATIONS

This application claims priority from U.S. Provisional Application Ser. No. 62/115,611 filed 12 Feb. 2015, which is titled "ALL TERRAIN VEHICLE ACCESSORY", which is hereby incorporated by reference.

FIELD OF THE INVENTION

The present invention is for devices for extricating mud stalled vehicles, and more particularly to a device which may be attached to a vehicle and selectively engaged independently from the vehicle's wheels and drive system to pull or push the vehicle free from the encumbrance.

BACKGROUND OF THE INVENTION

Riding ATVs is an extremely popular hobby for hunters, adventurers, and families of all sorts. One of, if not the most, favorite places/conditions to ride in is mud. Unfortunately, at some point, just about everyone gets trapped in the mud. Currently the only way to free the ATV is to either have someone pull you out (like with a tie strap, chain, or rope) with another vehicle or another ATV), (2) or use a winch to pull yourself out, or (3) manually dig out the ATV. Unfortunately, all three of these options require the person riding the ATV, or another person, to get dirty/muddy in order to get the ATV free of the mud.

What is needed is a selectively usable/engageable device which is attachable to the ATV so that it can be self-contained on the ATV and used when needed without needing the driver, or another person, to get dirty. Thus, you don't need someone/something to pull you out (like another ATV, mule, horse, etc.) and you don't need to get your winch cable out, extend the cable/rope, try to find something to tie the cable/rope around, and then power the winch to pull out the ATV. Further, it may be used even if there is no tree or other object nearby.

SUMMARY OF THE INVENTION

The present invention is directed to a vehicle extraction device, comprising a frame which is attachable to a vehicle's frame, a motor attached to the frame for rotating a first shaft, a second shaft which is linked to the first shaft by a linkage, one or more paddles attached to the second shaft and extending radially out therefrom, and wherein rotation of the first shaft causes the second shaft and the one or more paddles to rotate and wherein when the one or more paddles rotate, they impact ground or other surface below the vehicle and can propel the vehicle in one or more directions.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

Figure 1:
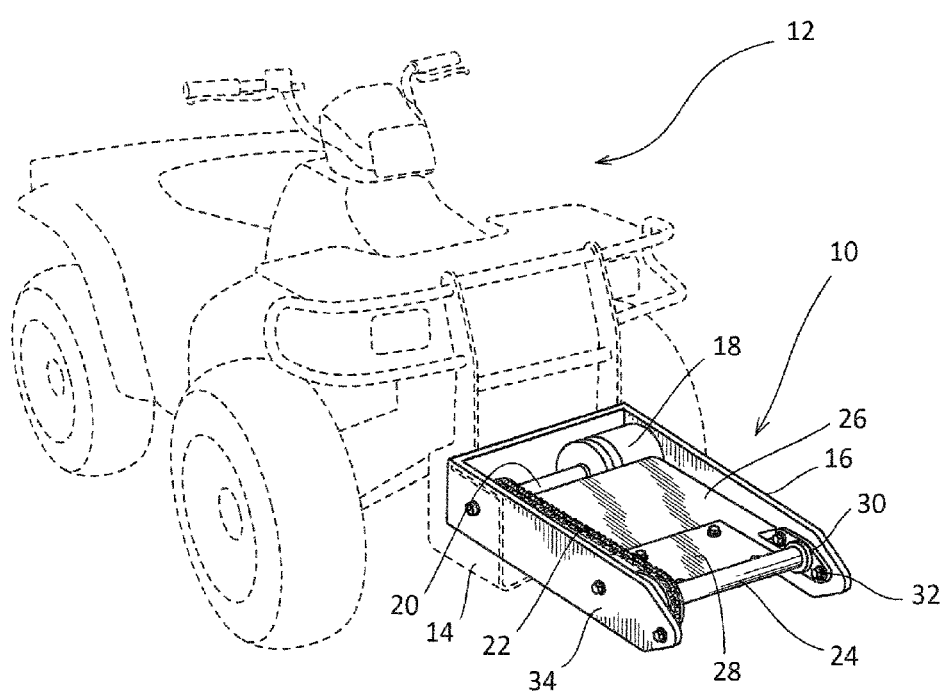
FIG. 1 illustrates a perspective view of an exemplary embodiment of the present invention installed on an exemplary vehicle.

FIG. 1 illustrates a perspective view of an exemplary embodiment of the present invention showing an exemplary vehicle extraction device 10, vehicle 12 (an all-terrain vehicle in this embodiment), mounting bracket 14, device frame 16, motor/winch housing (with motor/winch therein) 18, first shaft/motor axle/winch axle 20, linkage 22, second shaft/paddle shaft/Paddle axle 24, paddle(s) 26, paddle connector plate 28, bearing and mounting plate 30, nuts/bolts/screws 32, nuts/bolts/screws/axle anchors 36. In this embodiment, a winch, or other motor, is utilized to cause a shaft to rotate (winch axle 20 in this embodiment) as this shaft rotates, it is linked with another shaft (paddle axle 24 in this embodiment). In this embodiment, linkage 22 is comprised of a first gear which is fixed to first shaft 20, a second gear which is fixed to second shaft 24 and a chain which extends between the gears such that as first shaft 20 is rotated, it causes the first gear to rotate, which then causes the chain to move, causing the second gear to rotate, and, thus, second shaft 24. Although this is an exemplary configuration, any number of variable linkages may be utilized.

Note that one or more gears or other means is in contact with winch axle 20 such that when axle 20 rotates, the gears (or other means) causes chain 22 (or other linkage members) to rotate, which, in turn, causes paddle axle 24 to rotate. Note that although the motor in the figures and in the illustrated embodiment causes a shaft to rotate, which then rotates a gear, other geometries may be utilized such as, for example, in which the gear is directly rotated by the motor or the motor directly drives the linkage (i.e., chain) to drive the second gear. Further, in another embodiment, the motor may directly, or indirectly, drive the second shaft (in such an embodiment, there may be only one shaft, i.e., "shaft".

The illustrated embodiment may be attached to the front, rear or side of a vehicle. It is essential that the device be securely attached to the vehicle, and preferably to the frame either directly or indirectly, so that when the device is engaged, it is able to move the vehicle without damaging the vehicle itself or become disengaged from the vehicle.

The frame may be constructed of various geometries, but must be strong enough to maintain the relationship between the motor and the shaft(s) and/or gear(s) and allow the paddle(s) to rotate without encumbrance.

Figure 2:
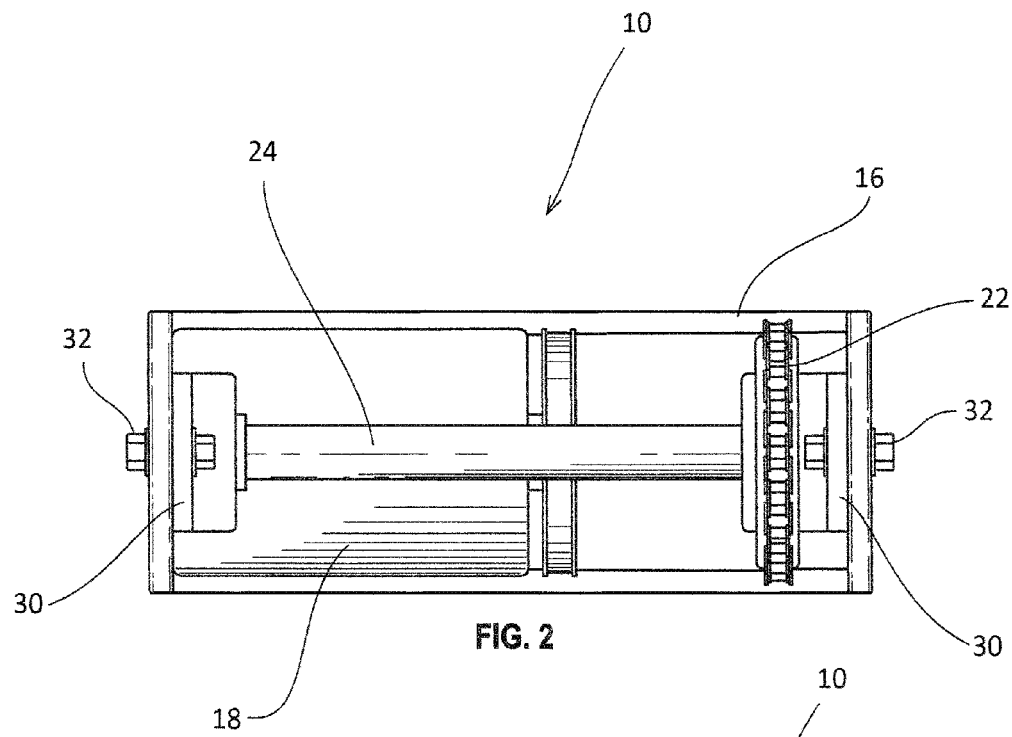
FIG. 2 illustrates a top view of the exemplary embodiment of FIG. 1.

FIG. 2 illustrates a top view of the exemplary embodiment of FIG. 1. Illustrated are device 10, frame 16, motor/winch housing (with motor/winch therein) 18, first shaft/motor axle/winch axle 20, linkage 22, second shaft/paddle shaft/paddle axle 24, bearing and mounting plate 30, nuts/bolts/screws 32, and nuts/bolts/screws/axle anchors 36.

Figure 3:
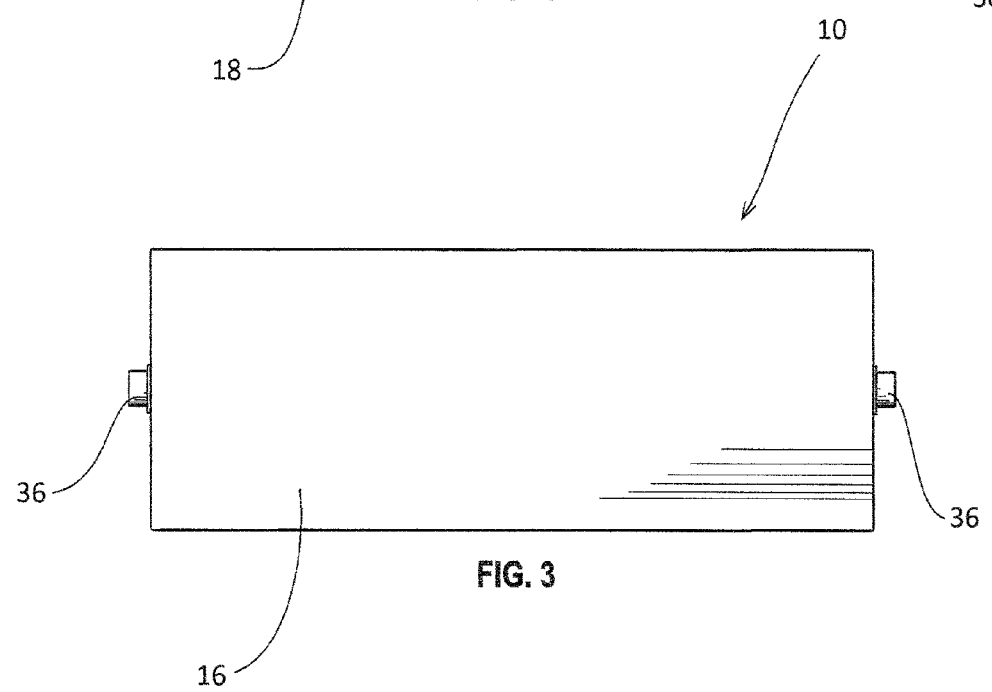
FIG. 3 illustrates a bottom view of the exemplary embodiment of FIGS. 1-2.

FIG. 3 illustrates a bottom view of the exemplary embodiment of FIGS. 1-2. Illustrated are axle anchors 36 and frame 16.

Figures 4, 5:
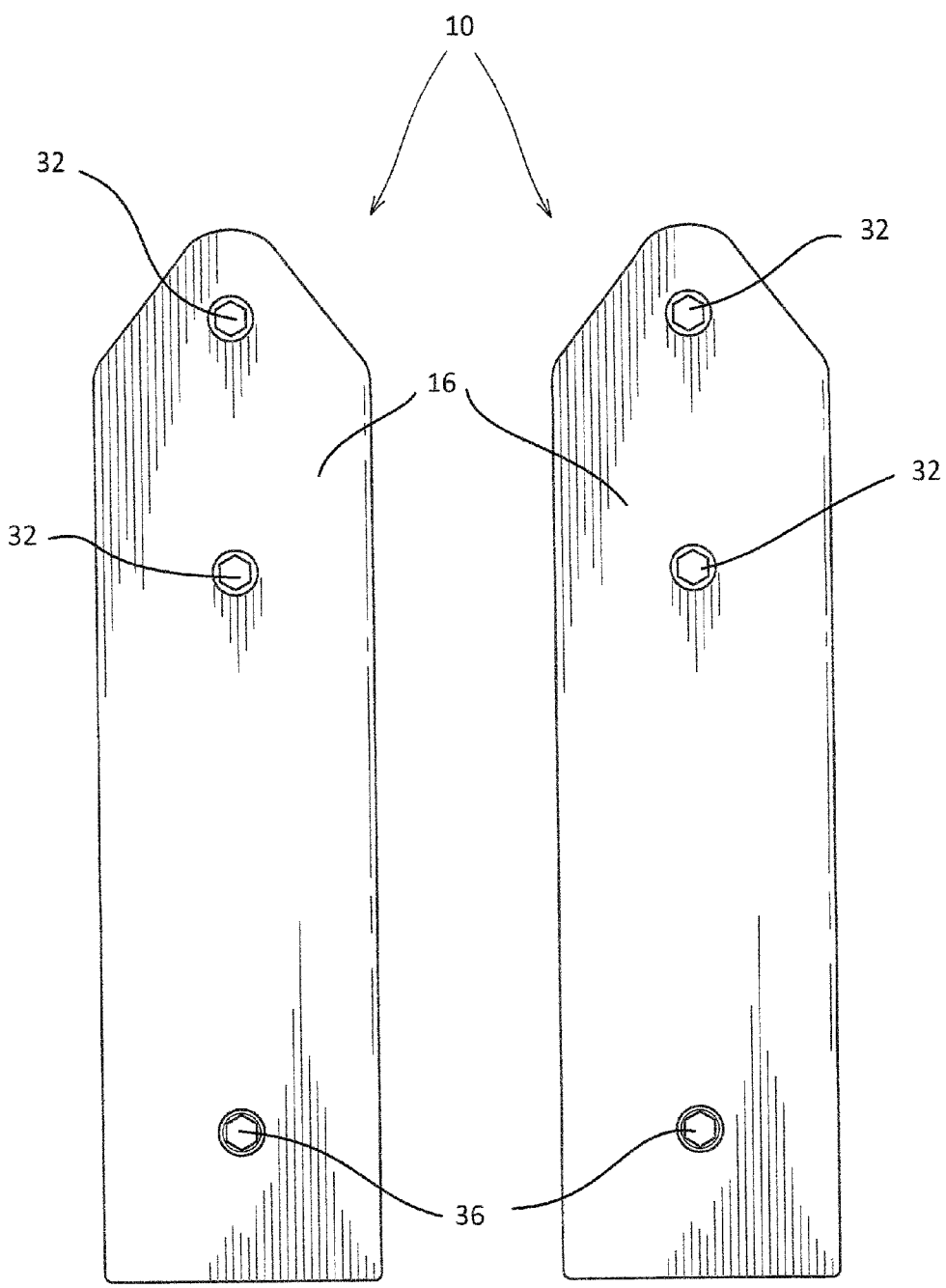
FIG. 4 illustrates a first side view of the exemplary embodiment of FIGS. 1-3.
FIG. 5 illustrates a second side view of the exemplary embodiment of FIGS. 1-4.

FIG. 4 illustrates a first side view of the exemplary embodiment of FIGS. 1-3. Shown are an exemplary relationship between device 10's frame 16 and various nuts/bolts/screws 32, and nuts/bolts/screws/axle anchors 36.

FIG. 5 illustrates a second side view of the exemplary embodiment of FIGS. 1-4. Shown are an exemplary relationship between device 10's frame 16 and various nuts/bolts/screws 32, and nuts/bolts/screws/axle anchors 36.

Figure 6:
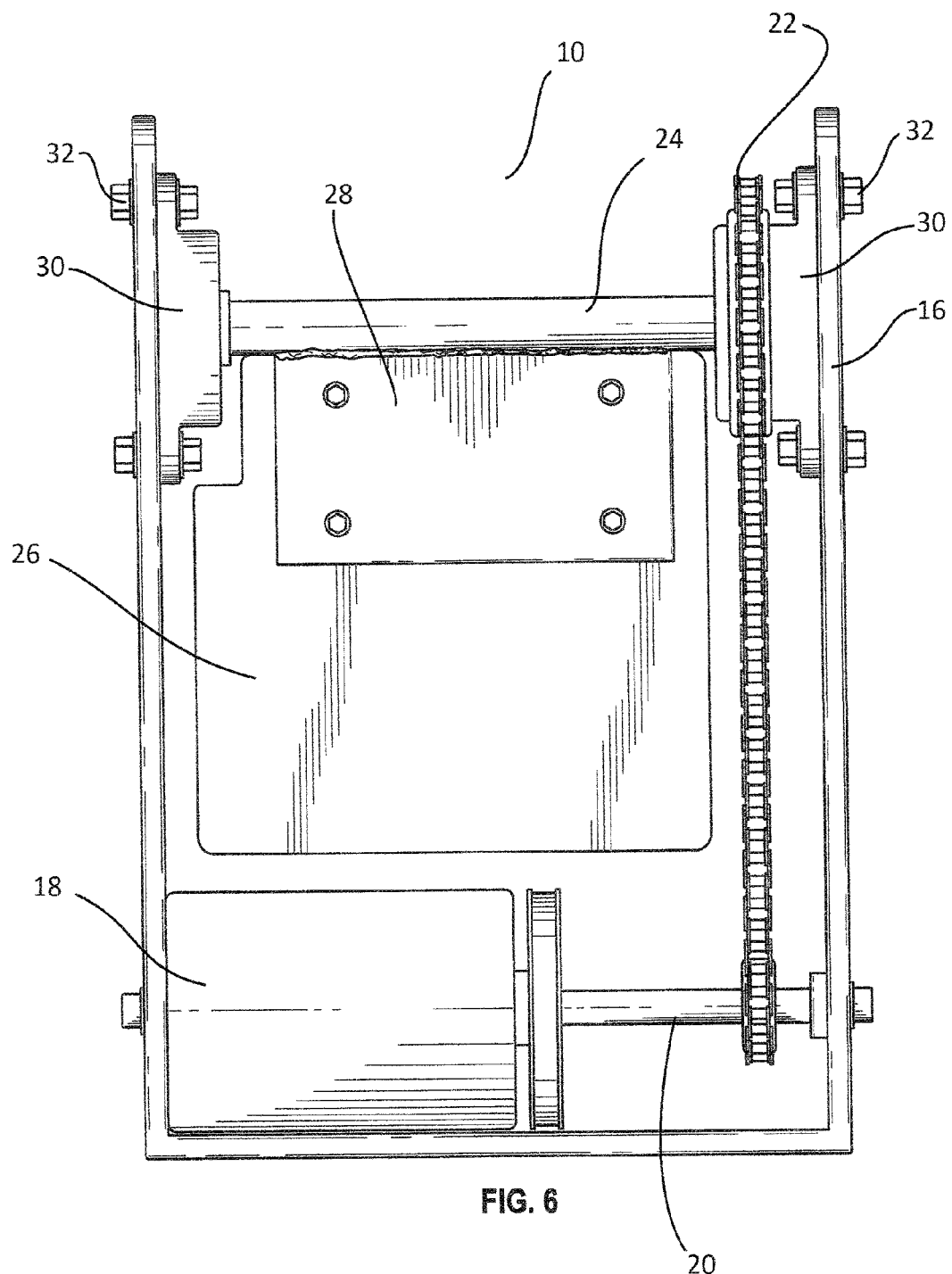
FIG. 6 illustrates a front view of the exemplary embodiment of FIGS. 1-5.

FIG. 6 illustrates a front view of the exemplary embodiment of FIGS. 1-5. Shown are vehicle extraction device 10, vehicle 12, mounting bracket 14, device frame 16, motor/winch housing (with motor/winch therein) 18, first shaft/motor axle/winch axle 20, linkage 22, second shaft/paddle shaft/paddle axle 24, paddle(s) 26, paddle connector plate 28, bearing and mounting plate 30, and various nuts/bolts/screws 32.

Figure 7:
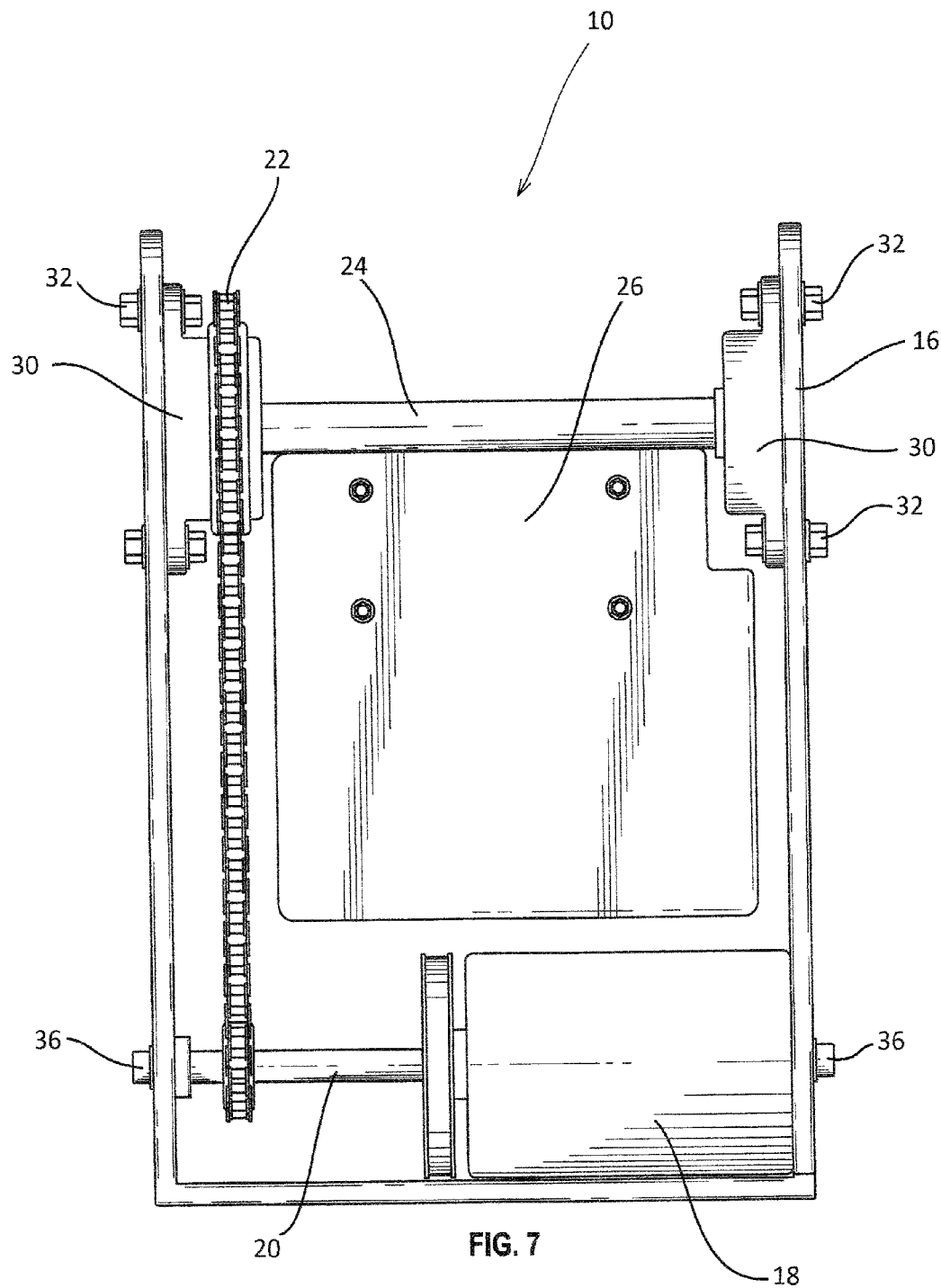
FIG. 7 illustrates a rear view of the exemplary embodiment of FIGS. 1-6.

FIG. 7 illustrates a rear view of the exemplary embodiment of FIGS. 1-6. Shown are vehicle extraction device 10, vehicle 12, mounting bracket 14, device frame 16, motor/winch housing (with motor/winch therein) 18, first shaft/motor axle/winch axle 20, linkage 22, second shaft/paddle shaft/paddle axle 24, paddle(s) 26, bearing and mounting plate 30, various nuts/bolts/screws 32, and nuts/bolts/screws/axle anchors 36.

Figure 8:
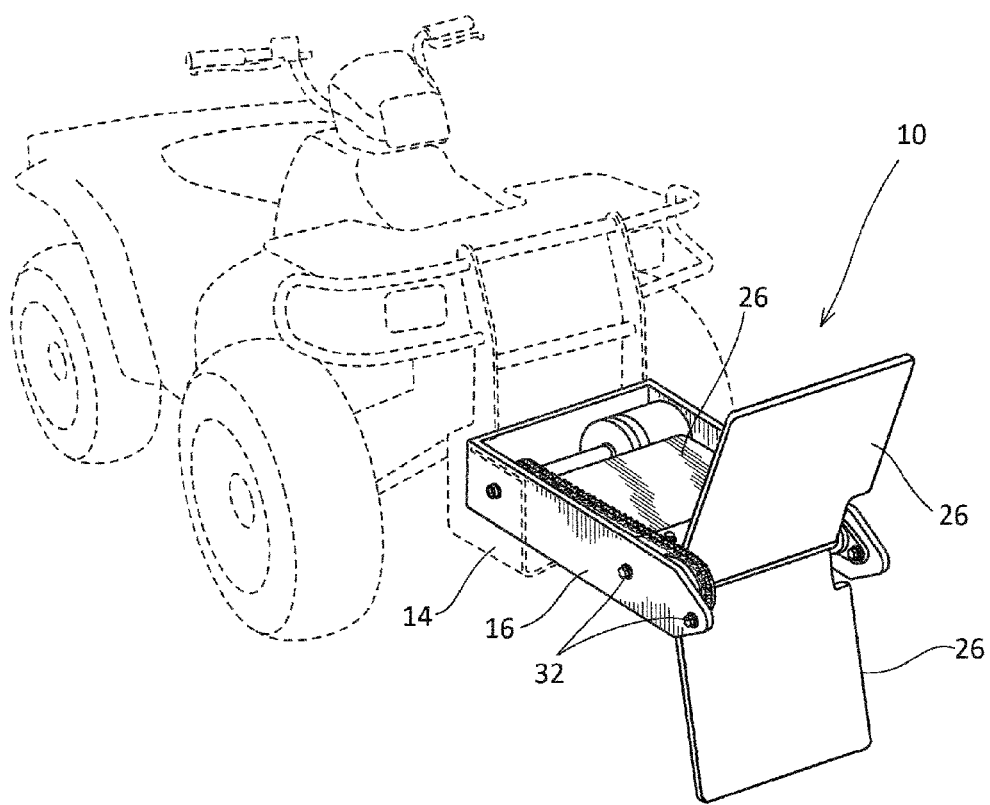
FIG. 8 illustrates a perspective view of another exemplary embodiment of the present invention having three paddles and wherein one of the paddles is engaged with the ground.

FIG. 8 illustrates a perspective view of another exemplary embodiment of the present invention having three paddles and wherein one of the paddles is engaged with the ground. Illustrated is an exemplary arrangement for vehicle extraction device 10 having a multiple paddle 26 configuration in which the angle between the paddles is approximately 120 degrees.

Figure 9:
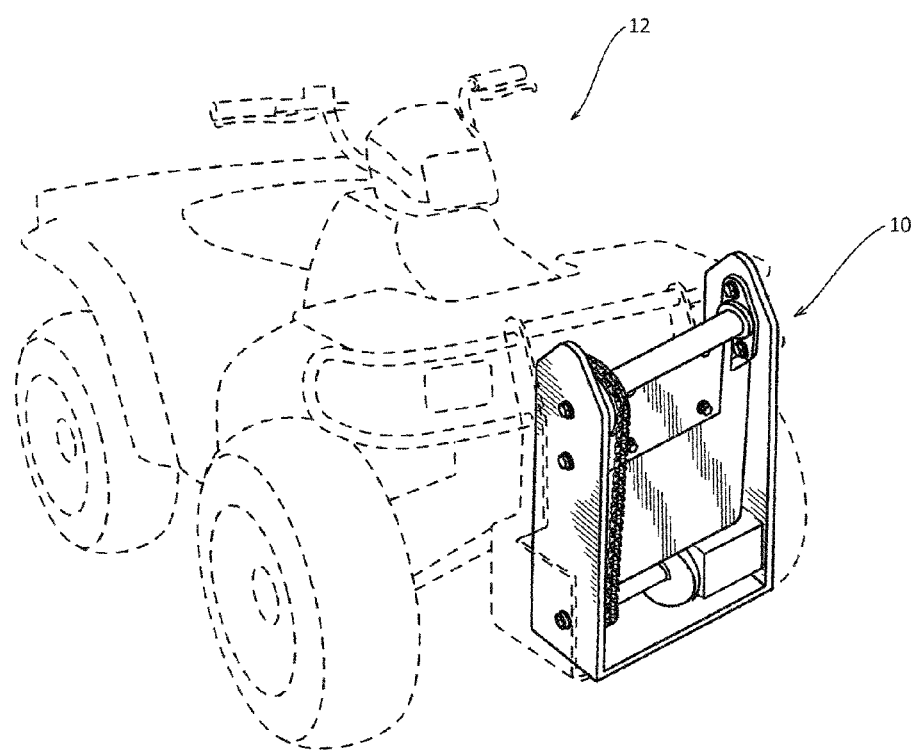
FIG. 9 illustrates a perspective view of the exemplary embodiment of FIG. 1 wherein the device is in an upright/disengaged position.

FIG. 9 illustrates a perspective view of the exemplary embodiment of FIG. 1 wherein the device is in an upright/disengaged position. Illustrated is an exemplary vehicle extraction device 10 with respect to a vehicle 12 wherein the device is in an upright condition for travel. Devices of the present invention may be adjustable from a vertical upright position to any suitable engaged position including, and even exceeding a horizontal condition.

A specific geometry for a paddle is illustrated as being generally planar though other geometries are also suitable in various embodiments including, but not limited to, blades, forks, fingers, claw-like and scooped. Similarly, the number of paddles is also variable from one to four (or more) depending on the use of the embodiment. In some embodiments, a single paddle may be sufficient and will be of the smallest profile. In some embodiments the paddles may be permanently attached to the second shaft such as by, for example, unitary construction, welding, gluing, bonding, etc. In some embodiments the paddles may be removable such as for transportation, servicing, adapted for a particular need, etc. Such paddles may be mounted/unmounted by any suitable means including, but not limited to, screwing, bolting, and slotting. In some embodiments, the paddle motion of the device may be similar to that of a paddle on a paddle boat.

Although various components of the present invention may be illustrated as being of a particular shape for convenience, such components may be of any suitable shape, configuration, orientation, etc.

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. A vehicle extraction device, said device comprising:
   a frame which is attachable to a vehicle's frame,
   a motor attached to said frame for rotating a first shaft,
   a second shaft which is linked to said first shaft by a linkage,
   one or more paddles attached to said second shaft and extending radially out therefrom, and
   wherein said rotation of said first shaft causes said second shaft and said one or more paddles to rotate and wherein when said one or more paddles rotate, said one or more paddles impact ground or other surface below said vehicle and can propel said vehicle in one or more directions and wherein said first shaft is able to rotate 360 degrees.

2. The device of claim 1, wherein said number of paddles is one.

3. The device of claim 1, wherein said number of paddles is two.

4. The device of claim 1, wherein said number of paddles is three or more.

5. The device of claim 1, wherein said frame may be pivoted with respect to said vehicle.

6. The device of claim 1, wherein a central axis of rotation of said first shaft is parallel to a central axis of rotation of said second shaft.

7. The device of claim 1, wherein said number of paddles is one.

8. The device of claim 1, wherein said frame can be attached to a front of a vehicle such that said first shaft, said second shaft, and said vehicle's drive shaft are all parallel.

9. The device of claim 1, wherein said frame can be attached to a vehicle's rear end such that said first shaft, said second shaft, and said vehicle's drive shaft are all parallel.

10. A vehicle extraction device, said device comprising:
    a frame which is attachable to a vehicle's frame,
    a motor attached to said frame for rotating a first gear,
    a second shaft which is linked to said first gear by a linkage,
    one or more paddles attached to said second shaft and extending radially out therefrom, and
    wherein said rotation of said first gear causes said second shaft and said one or more paddles to rotate and wherein when said one or more paddles rotate, said one or more paddles impact ground or other surface below said vehicle and can propel said vehicle in one or more directions.

11. A vehicle extraction device, said device comprising:
    a frame which is attachable to a vehicle's frame,
    a motor attached to said frame for rotating a shaft,
    one or more paddles attached to said shaft and extending radially out therefrom, and
    wherein said rotation of said shaft causes said one or more paddles to rotate and wherein when said one or more paddles rotate, said one or more paddles impact ground or other surface below said vehicle and can propel said vehicle in one or more directions and wherein said shaft is able to rotate 360 degrees.

* * * * *